April 23, 1946.    A. J. LARRECQ    2,399,046
GAS TURBINE POWER PLANT
Filed March 26, 1940
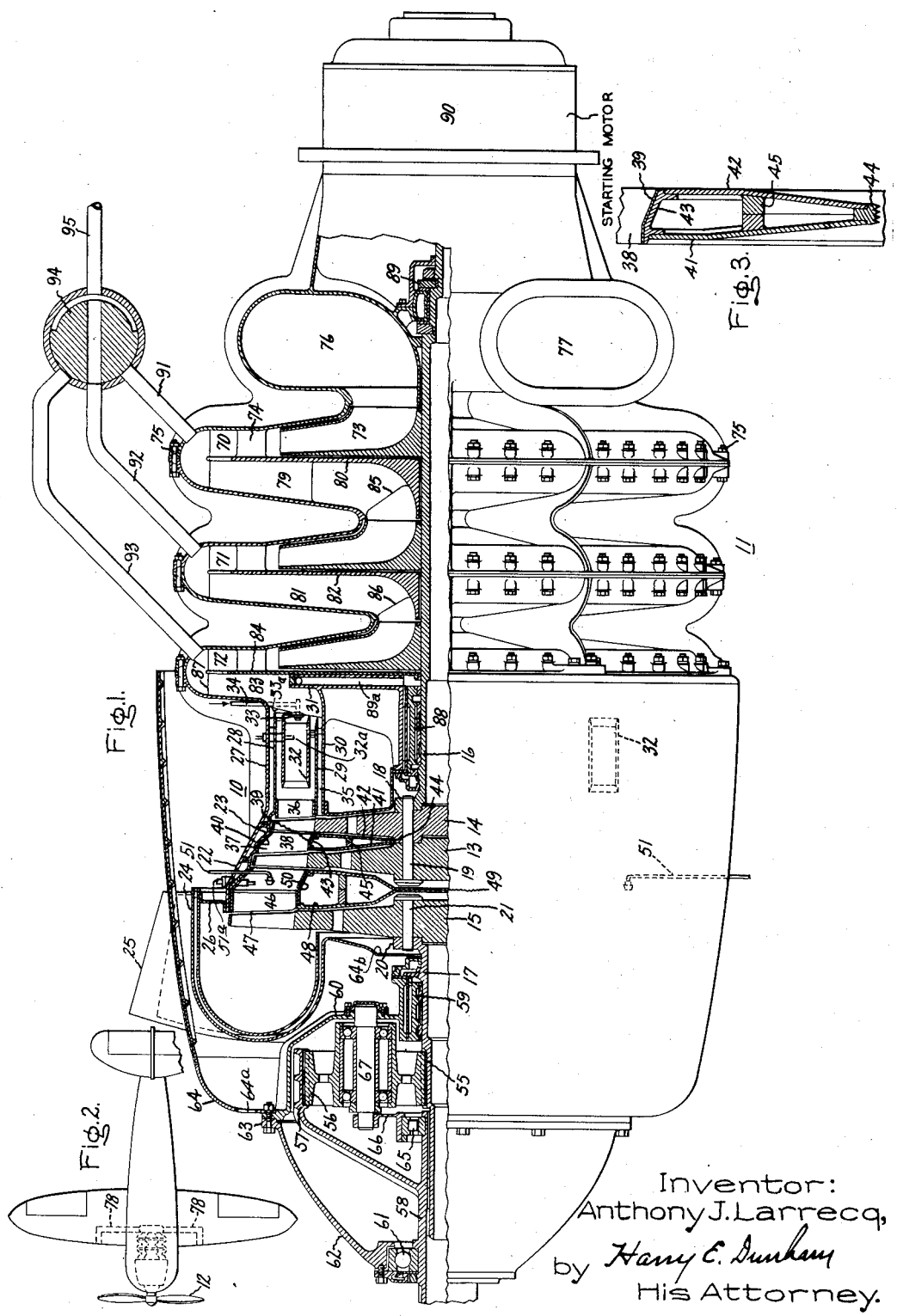
Inventor:
Anthony J. Larrecq,
by Harry E. Dunham
His Attorney.

Patented Apr. 23, 1946

2,399,046

UNITED STATES PATENT OFFICE 2,399,046

GAS TURBINE POWER PLANT

Anthony J. Larrecq, Marblehead, Mass., assignor to General Electric Company, a corporation of New York Application March 26, 1940, Serial No. 325,998

3 Claims. (Cl. 60—41)

The present invention relates to gas turbine power plants in which the power output of a gas turbine is used partly for operating a blower or compressor to furnish air under pressure for maintaining combustion in a combustion chamber or chambers. The invention is of particular significance in connection with gas turbine power plants for operating aircraft although it is not limited thereto necessarily.

The general object of my invention is to provide an improved construction and arrangement of gas turbine power plants whereby such plants assume a minimum space and may be operated effectively and economically.

For a consideration of other objects and of what I believe to be novel and my invention, attention is directed to the following description and the claims appended thereto in connection with the accompanying drawing.

In the drawing Fig. 1 illustrates a gas turbine power plant partly in section in accordance with my invention, Fig. 2 shows the location and arrangement of such plant on an aircraft; and Fig. 3 is an enlarged view of a part of Fig. 1.

The arrangement comprises a gas turbine 10 for driving a compressor 11 and a propeller 12 of an aircraft. The turbine in accordance with my invention includes two sets of bucket wheels, one set consisting of two bucket wheels 13 and 14, and a second set consisting of a single bucket wheel 15. The two sets are mechanically independent, that is, the two sets of wheels are secured to independent hollow shafts 16 and 17 respectively. The wheels 13 and 14 have solid disks securely held together and fastened to a flange 18 formed on the hollow shaft 16 by means of a plurality of bolts or pins 19. The shaft 16 serves for driving the compressor as will be more fully explained hereinafter. The disk of the bucket wheel 15 is secured to a flange 20 of the hollow shaft 17 by means of a plurality of pins 21. The shaft 17 is arranged to drive the propeller 12 as will be explained more fully hereinafter.

The turbine 10 has an outer shell or casing 22 and an inner shell or casing 23 made up of several sections flanged together and suitably secured to and supported on the outer casing. The inner and outer casings 22, 23 form a double wall surrounding the higher turbine stages including the bucket wheels 13, 14 to break up temperature and pressure drop across the individual casing. The last turbine wheel 15 is located inside a double walled exhaust casing 24 which has a rearwardly directed discharge conduit 25. The inner wall of the double walled exhaust casing 24 is secured to and supported on the outer turbine casing 22 by means of a flanged ring 26. The turbine shown is an internal combustion turbine, that is, one in which combustion of fuel takes place within combustion chambers formed inside the turbine casing. To this end the outer and inner turbine casings 22 and 23 are provided with concentrically spaced extensions 27 and 28. These extensions together with spaced cylindrical walls 29, 30 and an end wall 31 form a ring space accommodating and enclosing a plurality of spaced combustion chambers 32. Each combustion chamber is formed by a substantially cylindrical element open at both ends and spaced from and supported on the walls 28 and 29 and with an axis parallel to the axis of the turbine. Fuel is injected into the right-hand end of the chamber 32 by means including fuel injection nozzles 33 supported on a web 33a and connected to fuel supply conduits 34 projecting through an end portion of the outer casing extension 27. Each chamber 32 includes known means such as a spark plug 32a for initiating combustion during starting operation.

Air is supplied to the right-hand end of the ring space formed between the walls 27 and 30 from the discharge end of the compressor or blower 11. Part of this air flows into the inlet of the combustion chamber or cylinder 32 and mixes with the fuel discharged from the nozzle 33 and in view of its high temperature effects ignition and combustion of the latter. A part of the air passes through the space formed between the wall of the combustion cylinder 32 and the walls 28 and 29. This air cools these walls and mixes with the gases discharged from the left-hand end of the chamber 32, effecting combustion of unburned fuel. Another part of the air flows through the space formed between the walls 29 and 30, thereby reducing radiation of heat towards the shaft 16. This air is discharged from the left-hand end of said space through openings 35 towards the rim of the disk of the first stage bucket wheel 14, thereby cooling the disk and the buckets secured thereto. The combustion gases discharged from the chamber or chambers 32 are conducted to and properly directed towards the buckets of the first stage wheel 14 by a nozzle plate or diaphragm formed by partitions 36 secured to inner and outer bands, which latter are in turn secured to and supported on the walls 28 and 29 adjacent the buckets of the first wheel 14.

The bucket wheel 14 and the nozzle plate or diaphragm 36 form the first turbine stage. The second stage of the turbine includes the second bucket wheel 13 together with a diaphragm 37 located between the wheels 13, 14 and including an annular row of partitions 38 having ends secured to inner and outer bands 39 and 40 respectively. The outer band 40 is supported on the inner casing or shell 23. The inner band 39 is fused to a disk to reduce leakage of fluid along the adjacent sides of the wheels 13 and 14. In order to make this disk as light as possible it is made up of two rings or plates 41 and 42 with a spacer 43 fused between the outer ends of the plates and a sealing ring 44 fused to the inner ends of the plates (see Fig. 3). Intermediate portions of the two plates 41 and 42 are reinforced by rings 45 welded to the adjacent sides of the plates. The rings engage each other and prevent collapsing of the hollow disk.

The gases discharged from the bucket wheel 13 during operation are conducted to the bucket wheel 15 by means including a nozzle diaphragm 46. This nozzle diaphragm has an annular row of nozzles formed by a partition structure 47. The structure 47 is supported at its outer end on the turbine casing and is secured at its inner end to a disk 48. The disk 48 similarly to the disk of the diaphragm of the second stage is made up of two halves, that is, of two plates which have central portions 49 engaging each other and outer portions spaced apart and having edges fused to a spacer ring 50. The partition structure 47 is fused to the left-hand portion of the spacer ring 50 so that the left-hand edges of the partitions are in close proximity to the buckets of the wheel 15 whereas the right-hand edges are considerably axially spaced from the buckets of the wheel 13. The ring space thus formed between the buckets of the wheel 13 and the partition structure 47 serves as a reheat chamber for the gases discharged by the bucket wheel 13. The reheating is accomplished by the injection of fuel into the ring space by means including a plurality of nozzles 51 disposed in said ring space and arranged to receive fuel under pressure from a source, not shown. From another viewpoint, the ring space formed between the bucket wheel 13 and the bucket wheel 15 constitutes a combustion chamber for the turbine wheel or low pressure part 15 of the turbine arrangement, fuel being injected into said chamber at several points and the combustion of the fuel being effected by combustion gases and air discharged from the high pressure part of the turbine.

The propeller 12 is driven from the low pressure turbine shaft 17 through the intermediary of a gearing. This gearing includes a pinion 55 having teeth formed on the shaft 17 and engaging gearing means including a gear 56 which in turn meshes with an internal gear 57. The gear 57 is secured to a hollow shaft 58 telescoping an end portion of the turbine shaft 17 and constituting the propeller shaft. The shaft 17 is supported on a bearing 59 held on a stationary wall 60. The propeller shaft 58 is supported on a bearing 61 which in turn is held on a wall 62. The walls 60 and 62 have flanged portions 63 fastened to and supported on a hood structure 64. The latter has a reinforced, slightly conically-shaped portion surrounding the turbine and acting as a support for the latter as well as for the compressor. The front portion of the hood 64 has openings 64a for admitting cooling air to the space between the hood and the turbine casing. The turbine exhaust casing 24 has a central opening 64b surrounding the shaft. Cooling air is admitted through the opening 64b in the outer wall of the exhaust casing to pass through the space formed by the double wall of the exhaust casing.

The propeller shaft is supported at its right-hand end by a second bearing 65 held on a wall 66. The gear 56 rotates about a shaft 67 held on its outer ends on the walls 60 and 66.

The compressor 11, as stated above, is driven from the high pressure part of the turbine by the hollow shaft 16. The compressor includes three stages 70, 71 and 72. Each stage has an impeller wheel 73 secured to and driven from the hollow shaft 16 and a diffuser 74 for converting velocity energy of the air impelled by the impeller 73 into pressure energy. The outer casing of the compressor is made up of several sections flanged and secured together by bolts 75. The inlet section of the casing forms an inlet chamber 76 with two openings 77 connected to inlet conduits 78. As indicated in Fig. 2, the two inlet conduits are located on opposite sides and each one is formed by a channel in a wing and opens in the direction of the propeller slipstream of the aircraft. The air compressed in the first stage is conducted to the inlet of the second stage by a channel 79 formed by a portion of the outer casing and a partition 80 between the first and the second stage. Similarly, the air discharged from the second stage is conducted to the third stage by a channel 81 formed between the outer casing and a partition 82 between the second and the third stage. The air discharged from the third or last stage is conducted to the combustion chambers 32 and the ring space surrounding the latter by a channel 83 formed between a portion of the outer compressor casing and an end wall 84 of the compressor. The partitions 80, 82 and 84 form small clearances with the shaft and are supported on the outer casing by webs 85, 86 and 87 respectively.

The compressor shaft 16 is supported on two bearings, a bearing 88 located between the first turbine stage and the last compressor stage and a combined guide and thrust bearing 89 near the inlet end of the compressor. The bearing 88 is vented to atmosphere through a channel 89a.

A starting motor 90 is flanged to the right-hand end of the compressor casing for rotating the compressor shaft 16 during starting operation.

During starting operation the compressor is rotated by the starting motor 90. As soon as a certain speed of the compressor and consequently a certain pressure at the discharge of the compressor have been attained, fuel is injected into the combustion chambers 32 and ignited at the start by an electric spark to effect combustion and operation of the turbine by the combustion gases. Whenever high load output of the low pressure turbine part including bucket wheel 15 is desired, fuel is injected through the nozzles 51 and at the start ignited by an electric sparking device 51a to effect reheating of the combustion gases discharged from the high pressure turbine part. Such high load output in case where the low pressure part operates the propeller of an aircraft is necessary during starting and climbing of the aircraft.

The compressor also serves as a source for supercharging a passenger cabin or other sealed chamber or like consumer (not shown) requiring air under pressure during operation. In case of supercharged passenger cabin on an aircraft, increasing air pressure is required with increasing altitude. In order to obtain such increased supercharging of a cabin or like sealed chamber, I provide valved conduit means for connecting such cabin or chamber to either of the several compressor stages. In the present instance I have shown three conduits 91, 92 and 93 connected to the low pressure, intermediate and high pressure compressor stages respectively and a multi-way valve 94 for connecting either of said conduits to a supply conduit 95 for a cabin or chamber to be supercharged. In the instance shown the valve 94 connects the conduit 92, that is, the second stage of the compressor, with the supply conduit 95. In case the aircraft increases its altitude and increasing supercharging of the cabin is required, the supply conduit 95 may be connected to the last compressor stage by turning the valve 94 in clockwise direction and vice-versa, with decreasing altitude and less supercharging required, the supply conduit 95 may be connected with the low pressure compressor stage or completely disconnected from the compressor by turning the valve in counterclockwise direction.

What I claim as new and desire to secure by Letters Patent of the United States is:

1. Internal combustion gas turbine comprising a double-walled casing, a bucket wheel, a nozzle plate for directing combustion gases to the wheel, a plurality of circumferentially spaced combustion chambers ahead of the nozzle plate, means including an extension of the casing and an inner double wall enclosing the combustion chambers, and fuel and air supply means connected to the combustion chamber, said inner double wall forming a channel for conducting cooling air from the air supply means to the rim of the bucket wheel.

2. An aircraft including a gas turbine having an inner and an outer casing with cylindrical concentrically spaced extensions at the inlet, a plurality of circumferentially spaced combustion chambers disposed within the inlet and a compressor driven from the turbine and having a discharge end connected to supply air to said combustion chambers and cooling air to the space formed between said cylindrical extensions and air under pressure to a consumer.

3. An aircraft including a gas turbine having an inner and an outer casing with cylindrical concentrically spaced extensions at the inlet, a plurality of circumferentially spaced combustion chambers disposed within the inlet and a multi-stage compressor driven from the turbine and having a discharge end connected to supply combustion air to the combustion chambers and cooling air to the space formed between said cylindrical extensions, and means including a plurality of conduits connected to separate stages and a valve for selectively discharging air from any of such stages.

ANTHONY J. LARRECQ.